Nov. 30, 1954 J. H. STARR 2,695,576
SEEDING ATTACHMENT FOR DISK TILLERS
Filed April 2, 1949 12 Sheets-Sheet 1

FIG. 1

INVENTOR.
JOHN H. STARR
BY
ATTORNEYS

FIG. 1c

INVENTOR.
JOHN H. STARR

Nov. 30, 1954  J. H. STARR  2,695,576
SEEDING ATTACHMENT FOR DISK TILLERS
Filed April 2, 1949  12 Sheets-Sheet 5

FIG. 2

INVENTOR.
JOHN H. STARR
BY
ATTORNEYS

Nov. 30, 1954  J. H. STARR  2,695,576
SEEDING ATTACHMENT FOR DISK TILLERS
Filed April 2, 1949  12 Sheets-Sheet 7

INVENTOR.
JOHN H. STARR
BY
ATTORNEYS

Nov. 30, 1954　　　　J. H. STARR　　　　2,695,576
SEEDING ATTACHMENT FOR DISK TILLERS
Filed April 2, 1949　　　　　　　　　　12 Sheets-Sheet 8

FIG. 7

INVENTOR.
JOHN H. STARR
BY
ATTORNEYS

Nov. 30, 1954 J. H. STARR 2,695,576
SEEDING ATTACHMENT FOR DISK TILLERS
Filed April 2, 1949 12 Sheets-Sheet 9

FIG. 8

INVENTOR.
JOHN H. STARR
BY
ATTORNEYS

Nov. 30, 1954   J. H. STARR   2,695,576
SEEDING ATTACHMENT FOR DISK TILLERS
Filed April 2, 1949   12 Sheets-Sheet 12

FIG. 11

INVENTOR.
JOHN H. STARR
BY
Roger C. Johnson
ATTORNEYS

United States Patent Office 2,695,576
Patented Nov. 30, 1954

2,695,576
SEEDING ATTACHMENT FOR DISK TILLERS

John H. Starr, Mayville, Wis., assignor to John Deere Van Brunt Company, Horicon, Wis., a corporation of Wisconsin Application April 2, 1949, Serial No. 85,159

2 Claims. (Cl. 111—9)

The present invention relates generally to agricultural implements and more particularly to planters and similar machines.

The object and general nature of the present invention is the provision of a new and useful seeding attachment adapted to be mounted on disk tillers and similar ground-working machines, and the new and useful combination of such a seeding attachment with a disk tiller or similar ground-working machine. More particularly, it is an important feature of this invention to provide a new and improved seeding attachment adapted to be mounted on a disk tiller and operated from one of the ground wheels of the tiller. It is also an important feature of this invention to provide a seeding attachment in which the operation of the seeding mechanism is controlled by the raising and lowering of the disk gangs of the tiller, and it is a further feature of this invention to provide a seeding attachment particularly adapted to be mounted on a disk tiller of the type having a castering land wheel, with new and improved means for driving the seeding mechanism through a connection with the castering land wheel, which connection does not appreciably interfere with the castering movements of the ground wheel.

Another important feature of the present invention is the provision of a new and useful seeding attachment having a main unit and a plurality of auxiliary units, especially adapted to be mounted on a disk tiller of the type including a main soil-working unit and one or more auxiliary soil-working units, there being one auxiliary seeding unit for each of the auxiliary tilling units whereby when one or more of the tilling units are taken away or added to the implement to decrease or increase the operating width of the machine as a whole, the adaptation of the seeding apparatus to such a change may readily be accomplished.

Still further, another feature of the present invention is the provision of an auxiliary gear change unit adapted to be interposed between the ground wheel drive and the seeding mechanism so as to provide for changing the rate of flow of the seed, as desired.

These and other objects and advantages of the present invention will be apparent to those skilled in the art after a consideration of the following detailed description, taken in conjunction with the accompanying drawings, in which:

Figures 1 through 1c are overlapping front elevational views, looking rearwardly, showing a disk tiller with auxiliary tilling units equipped with a seeding attachment having a main seeding unit and auxiliary units to correspond to the auxiliary tilling units, in which the principles of the present invention have been incorporated.

Figure 1:
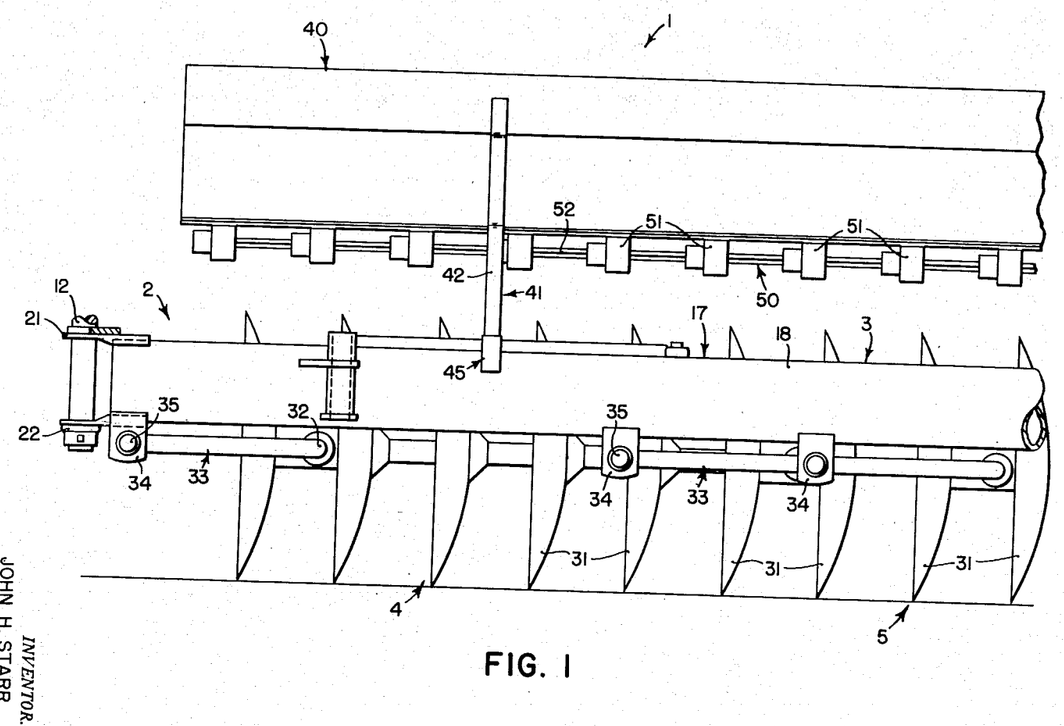
Figure 1A:
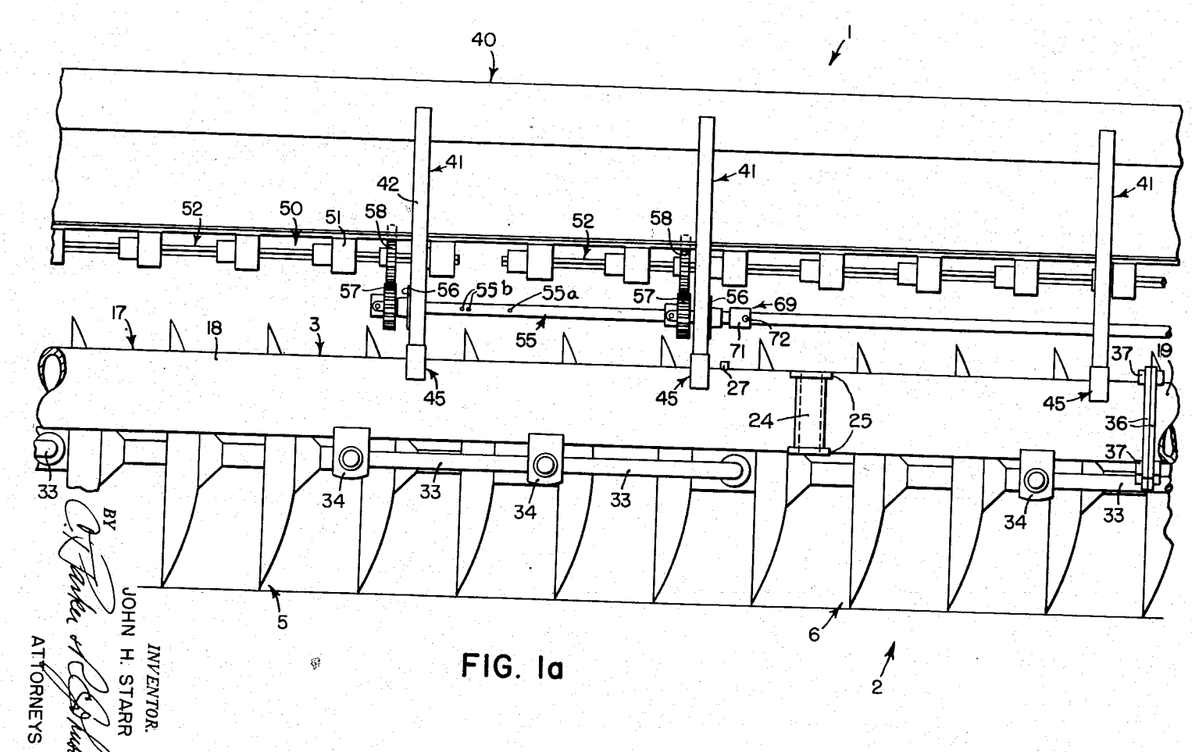
Figure 1B:
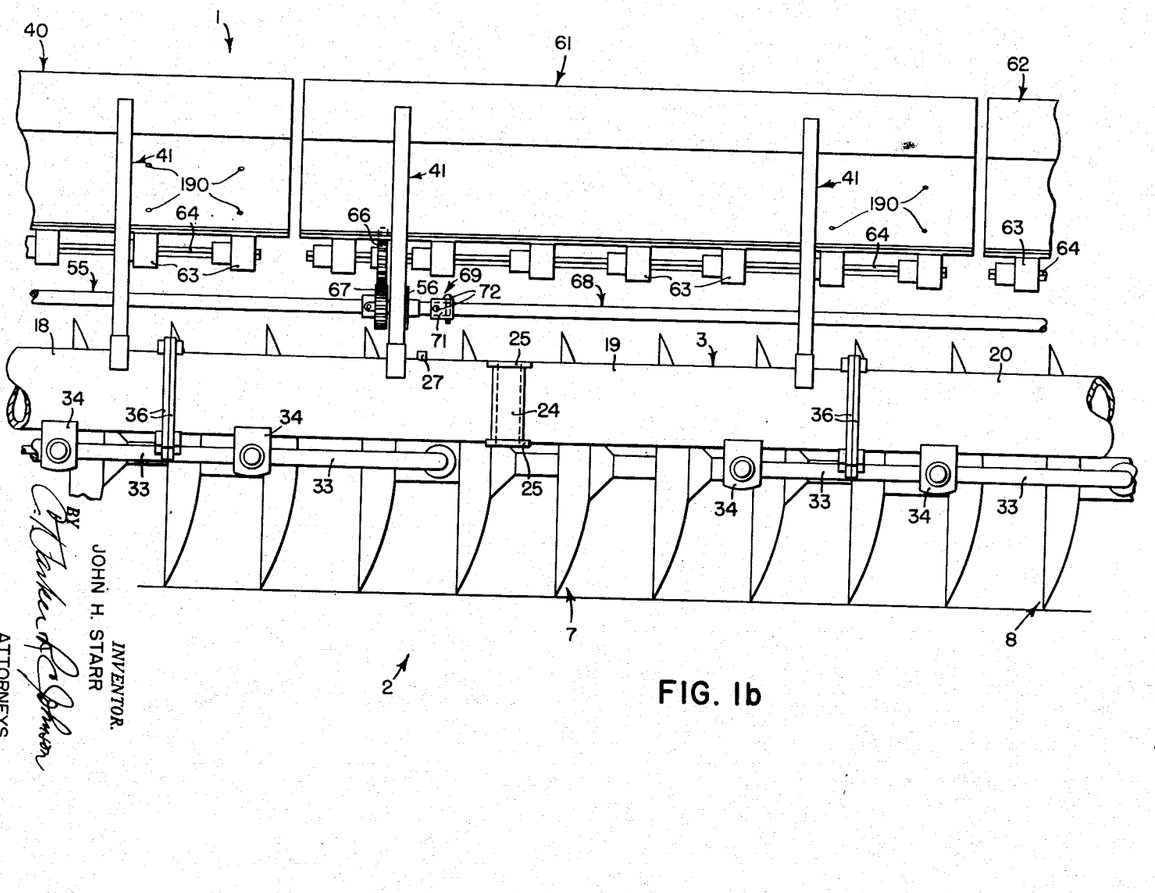
Figure 2:
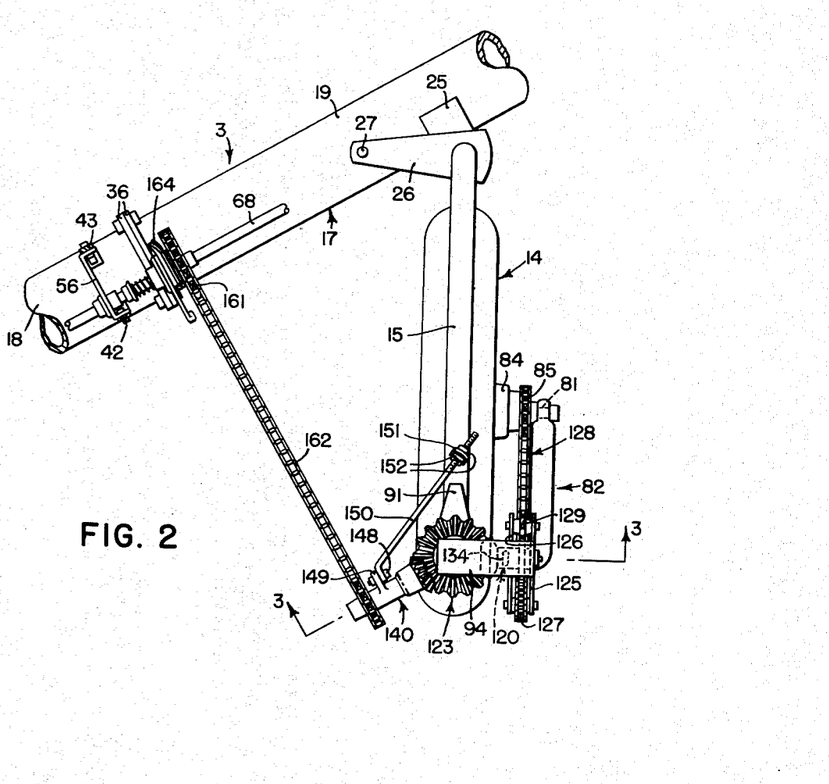
Figure 2 is a fragmentary plan view of the rear portion of the outfit shown in Figure 1, certain parts being broken away in order to show certain portions of the driving connections between the land wheel and the seeding mechanism of the seeding attachment somewhat more clearly.

Referring now particularly to Figures 1 through 1c, the seeding attachment which constitutes the principal feature of the present invention is indicated in its entirety by the reference numeral 1 and is shown as mounted on a disk tiller which is indicated in its entirety by the reference numeral 2. The disk tiller 2 comprises a main frame 3, a plurality of axially aligned gangs 4, 5, 6, 7 and 8 of tiller disks and supporting wheels, one of which is carried by a front wheel bracket 12 (Figure 1) that is rigidly fixed to and serves as a part of the frame 3. The above-mentioned supporting wheels also include a rear castering land wheel 14 (Figure 2). Forming a part of the frame 3 is a land wheel bracket 15 upon which the castering land wheel 14 is pivotally mounted. Preferably, the frame 3 includes an elongated pipe frame member 17 which is made up of a main pipe frame member 18 and one or more auxiliary pipe frame members 19 and 20. The front wheel bracket 12 is connected to the forward or right hand end of the main frame pipe member 18 by suitable upper and lower connecting lugs 21 and 22, the lower and rear portion of the wheel supporting bracket 12 being carried in the lugs 21 and 22 and held against swinging movement relative thereto by any suitable means. The land wheel bracket 15 has its lower and rear portions disposed in a sleeve member 24 (Figures 1a, 1b and 1c) fixed to the associated frame pipe section by upper and lower lugs 25 and held rigidly against lateral movement relative thereto by any suitable means, such as an arm 26 (Figure 2) fixed to the bracket 15 and engaging a lug 27 on the associated pipe frame member. In this way, the various pipe frame members and the wheel-supporting brackets 12 and 15 form a rigid part of the main frame 3.

Each disk gang 4, 5, etc., includes a plurality of tiller disks 31 which are mounted in spaced relation on a gang bolt or shaft, the disks being held in spaced apart relation by suitable spacers, certain of which carry or are provided with suitable bearings to receive the rearwardly extending portions 32 of a pair of bail members 33, the forward end portions 35 of which are rockably received in bearing means 34 welded or otherwise fixed to the lower side of the associated pipe frame member. The rear bail member of each disk gang unit is link-connected with the front bail of the next rearward disk gang, whereby contiguous ends of adjacent gangs move upwardly or downwardly together relative to the main frame 3. Suitable means, such as, for example, mechanism like that shown in the copending application, Ser. No. 742,234, filed April 18, 1947, by Walter H. Silver and John I. Cantral, now U. S. Patent 2,648,270, is provided for simultaneously swinging all of the bail members 33 upwardly or downwardly, each relative to the disk tiller frame 3 about the transverse axis formed by the associated bail end portion 35 (Figure 6), for raising or lowering the disk gangs, for adjusting the depth of operation and for shifting the gangs into and out of their transport position. Preferably, the raising and lowering means includes one or more springs whereby contiguous ends of adjacent gangs may move upwardly or downwardly relatively to the other gang units whereby the machine readily accommodates passage of the machine over uneven ground. As will be explained later in detail, the swinging action of at least one of the bail portions when the disks are raised and lowered is made use of in controlling the drive to the feeding mechanism of the seeding attachment.

The main frame 3 of the disk tiller includes means for rigidly interconnecting the frame pipe members 18, 19 and 20. To this end, adjacent ends of the pipe members are provided with flanges 36 which are apertured to receive connecting bolts 37. Preferably, also, each of the pipe members includes a wheel-bracket-receiving sleeve 24 so that the land wheel 14 and associated parts may be connected with any one of the pipe members, thereby providing for increasing or decreasing the width of the machine by making it possible to take out or add additional disk gang units and associated frame pipe members. If a relatively small machine is desired, the auxiliary pipe frame members 19 and 20 and associated disk gangs may be taken away and the land wheel bracket 15 connected with the sleeve 24 on the rear end of the main pipe frame member 18. The connections between adjacent disk gang bails are so constructed and arranged as to be readily connectible and disconnectible to facilitate the addition to or removal of the frame and gang units.

Figure 5:
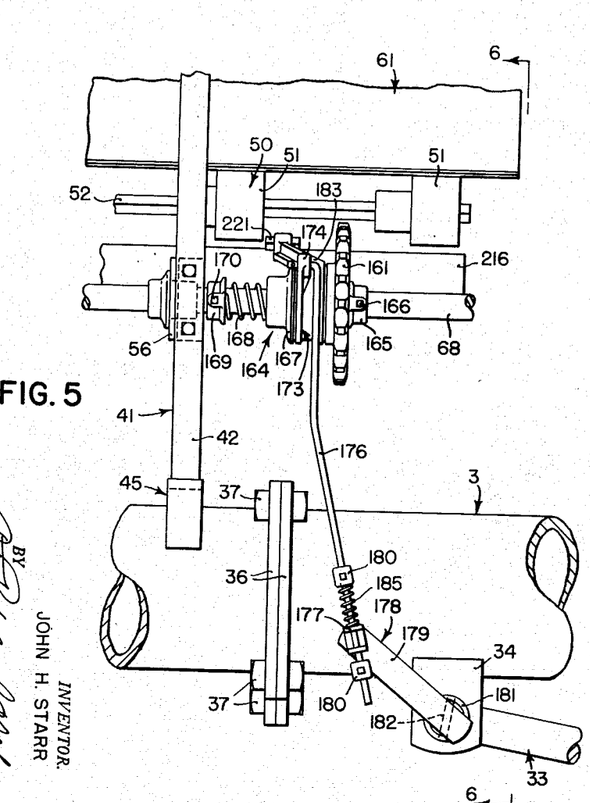
Figure 5 is a fragmentary elevational view of the seeding clutch and its control by one of the bails swingable connecting a disk gang to the tiller frame.
Figure 6:
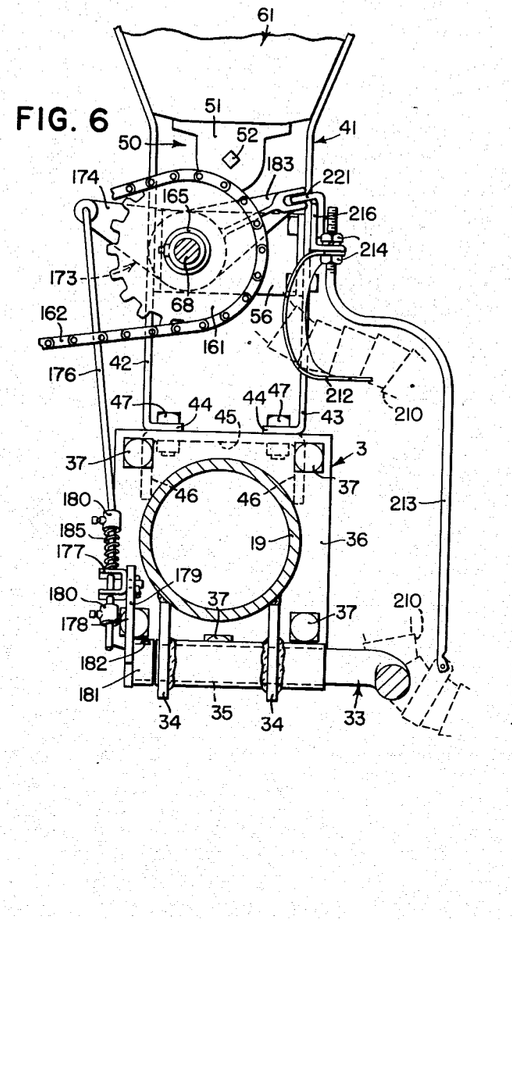
Figure 6 is an end view of the clutch and clutch control mechanism shown in Figure 5, corresponding generally to a section taken along the line 6—6 of Figure 5.

The seeding attachment, with which the present invention is more particularly concerned, will now be described. The seeding attachment 1 includes a main hopper or seed box 40 which is supported on the main pipe frame member 18 by means of a plurality of supporting brackets 41. As best shown in Figure 6, each hopper-supporting bracket 41 comprises front and rear strap members 42 and 43 having lower inturned portions 44 which are arranged to be mounted on a U-shaped support, preferably in the nature of a strap 45 having its downturned ends 46 welded to the pipe member 18. The upper ends of the bracket straps 42 and 43 are shaped to receive the main hopper or seed box 40 in supporting relation. The lower inturned portions 44 are apertured to receive connecting bolts 47, as best shown in Figure 6. The lower portion of the seed box 40 carries seeding mechanism 50 of conventional construction which includes a plurality of seed-delivering mechanisms 51 and a seeding shaft 52 which extends along the bottom of the seed box 40 for driving the seed-delivering mechanisms 51. The seeding attachment includes a jackshaft that comprises a main jackshaft section 55 (Figure 1a), which is supported on the associated supporting brackets 41 by bearing plates 56 (Figure 5), and auxiliary jackshaft sections 68. The jackshaft section 55 carries set screw receiving holes or recesses 55a and 55b (Figure 1a). A gear 57 on the main jackshaft section 55 meshes with a gear 58 on the seeding shaft 52 of the main hopper or seed box 40 whereby when the jackshaft section 55 is rotated the various seed-delivery mechanism 51 of the seed box 40 are actuated. If desired, the seeding shaft 52 may be formed of two sections, as best shown in Figure 1a, each driven by a gear 58 thereon meshing with the associated gear 57 on the jackshaft section 55.

The seeding attachment also includes one or more auxiliary hoppers or seed boxes, as shown at 61, 62, etc. Each of these auxiliary seed boxes are of substantially the same construction and therefore a description of one will suffice. Each of the auxiliary seed boxes includes a plurality of seed-delivering mechanisms 63 actuated by a seeding shaft 64, and, in the case of the auxiliary seed box 61, the shaft 64 is driven by a gear 66 meshing with a gear 67 on the jackshaft section 55, which is carried by the brackets 41 that support the auxiliary seed box 61 on the auxiliary frame pipe member 19. The seeding shaft 64 of the auxiliary seed box 62 is driven by an auxiliary jackshaft section 68 that is interconnected with the main jackshaft section 55 by means of a quick detachable connection 69. The connection 69 may be of any suitable construction, but preferably comprises a sleeve member 71 fixed to one of the associated jackshaft sections and a quick detachable pin 72 or the like which extends through an aperture in the adjacent end of the next jackshaft section 68.

The main jackshaft section 55 and the auxiliary jackshaft sections 68 constitute a jackshaft which is adapted to be driven, according to the principles of the present invention, from the castering land wheel of the tiller, and the connections for driving the jackshaft sections from the land wheel 14 will now be described.

Figures 3, 4:
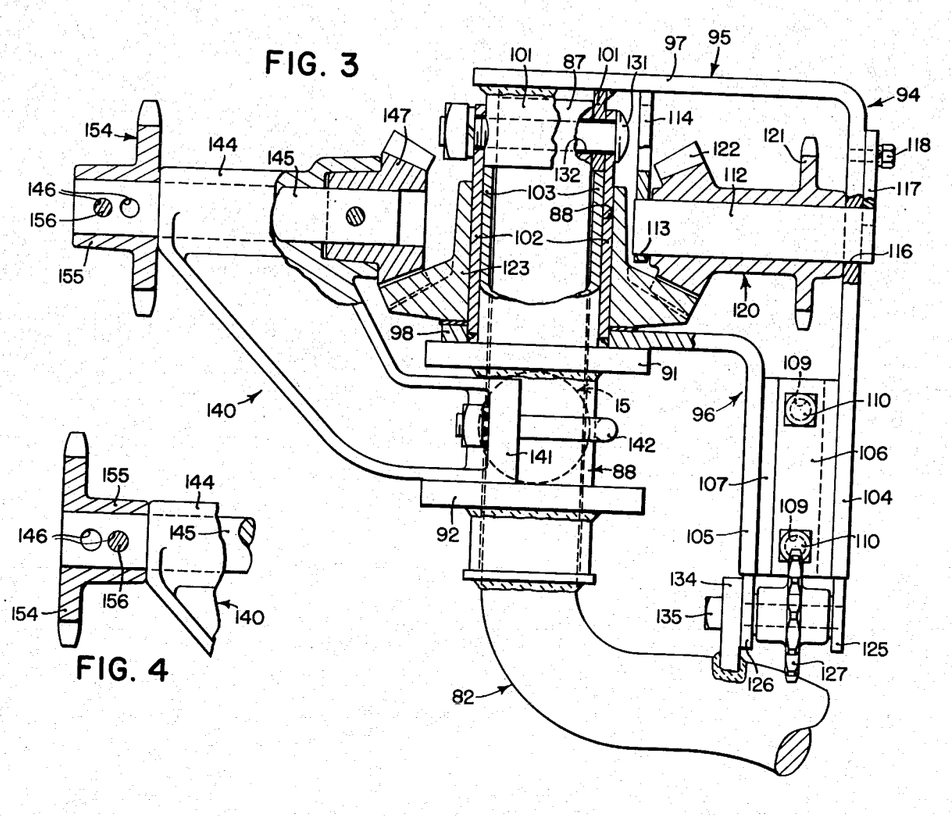
Figure 3 is a fragmentary detail view of the drive mechanism associated with the castering ground wheel support, corresponding generally to a view taken along the line 3—3 of Figure 2.
Figure 4 is a fragmentary view showing one of the optional positions of the drive sprocket arranged to operate with the speed-change unit shown in Figures 7 and 8.

The land wheel 14 is shown as mounted for rotation on a stub shaft 81 that forms a part of the castering wheel spindle which is indicated in its entirety by the reference numeral 82. Secured to one side of the wheel 14 is a drive sprocket bracket 84 which carries a drive sprocket 85. The upper end of the castering wheel spindle 82 includes a vertically extending section 87 that is disposed for rotary movement within a vertical sleeve 88 which forms a part of the wheel bracket 15 and is connected to the main body of the latter member by upper and lower plates 91 and 92 preferably welded to the sleeve 88 and to the main body of the wheel bracket 15. The upper end of the spindle section 87 extends generally vertically upwardly beyond the sleeve 88 and receives a stub shaft support 94. The support 94 comprises a pair of L-shaped strap members 95 and 96 having laterally directed horizontal portions 97 and 98 which are connected, respectively, as by welding, to a pair of telescopically associated sleeve members 101 and 102, the sleeve member 102 fitting snugly over the upper end 103 of the sleeve 88. The strap members 95 and 96 have lower or depending sections 104 and 105 to which elongated brackets 106 and 107 are welded. These brackets overlap and are apertured, as at 109, to receive a pair of bolts 110 by which the two bracket members 95 and 96 are connected together. A stub shaft 112 is received in an aperture 113 formed in a depending hanger 114 connected at its upper end to the horizontal portion 97 of the strap member 95, the other end of the stub shaft 112 extending through an aperture 116 in the vertical portion 104 of the strap member 95. A short piece 117 is welded to the end of the stub shaft 112 and is apertured to receive a bolt 118 by which the stub shaft 112 is held in position. Mounted for rotation on the stub shaft 112 is a compound gear member 120 which includes a sprocket 121 and a drive pinion 122. The latter member meshes with a bevel gear 123 which is mounted for rotation on the sleeve section 102 and rotates about the axis of the upper section 87 of the wheel spindle 82. Apertured lugs 125 and 126 are fixed to the lower end of the strap sections 104 and 105 and are apertured to receive a pin on which an idler sprocket 127 is mounted for rotation. A drive chain 128 is trained over the drive sprocket 85, the sprocket section 121 of the compound gear 120 and the idler sprocket 127. The lugs 125 and 126 are extended rearwardly, as best shown in Figure 2, and are slotted to receive a chain-tightener sprocket 129. By this means the sprocket 85 on the land wheel 14 drives the compound gear member 120 and the latter in turn drives the bevel gear member 123. In order to keep the several driving parts, just mentioned, in alignment, the bracket 94 is caused to turn with the wheel spindle 82 by means of a bolt 131 which is extended through openings in the overlapping portions of the sleeves 101 and 102 and an opening 132 in the upper end of the vertical spindle section 87. Cooperating with the bolt 131 for anchoring the support 94 to the land wheel spindle 82 is a lug 134 welded to the land wheel spindle 82, as best shown in Figure 3, and apertured to receive a bolt 135 which securely fastens the intermediate portion of the inner idler support member 126 of the chain-tightener bracket to the lug 134.

A second shaft-supporting bracket 140 is provided, preferably being in the form of an angled member having a lower socket section 141 which is rigidly clamped to the wheel bracket sleeve 88 by any suitable means, such as a U-bolt 142. The upper and inner portions of the bracket 140 are provided with a bearing sleeve section 144 in which a stub shaft 145 is journaled. The outer end of the shaft 145 carries a pair of apertures 146, for a purpose which will be referred to below, and the inner end of the shaft 145, which extends radially with respect to the axis of swinging movement of the wheel spindle, carries a pinion 147 which meshes with the bevel gear 123 generally opposite the drive pinion 122. The bracket 140 is reenforced by a brace member 150 which is bolted, as at 148, to an apertured lug 149 (Figure 2) on the bracket 140 and to a lug 151 welded to the wheel bracket 15. The associated end of the brace 150 is threaded and receives a pair of lock nuts 152, one on each side of the lug 151. Thus, the bracket 140 is connected so as to become a fixed part of the disk tiller frame, being rigidly connected to the land wheel bracket or arm 15, as best described. A sprocket 154 having an apertured hub 155 is mounted on the outer end of the stub shaft 145 and is rigidly connected to the latter by means of a pin 156 insertable in one of the openings 146, the sprocket normally being in the position shown in Figure 3. The pinion 147, shaft 145 and adjustable gear 154 constitute the equivalent of a second compound gear, similar to the compound gear 120 mentioned above.

When the seeding attachment is arranged with the main seed box and one or more auxiliary seed boxes, a sprocket 161 is mounted on the jackshaft section 68 and is connected with the drive sprocket 154 by means of a driving chain 162. The sprocket 161 is connected to the jackshaft section 68 by means of a clutch unit 164. The clutch unit 164 comprises a first collar 165 fixed, as by a set screw 166, to the shaft 68, the set screw 166 entering a hole or recess in the shaft 68. The sprocket 161 includes clutch teeth which cooperate with the corresponding clutch teeth formed on a companion axially shiftable clutch member 167 which is biased for movement toward the sprocket 161 by means of a spring 168. This spring bears at one end against the clutch member 167 and at the other end against a second collar 169 that is fixed by means of a set screw 170 to the jackshaft section 68, the set screw 170 entering one of the two optional holes or recesses in the shaft 68. The holes or recesses in the shaft 68 are located like the holes 55a and 55b in the shaft 55, Figure 1a, to which reference is made below. A rockable clutch-controlling member 173 is disposed between the sprocket 161 and the clutch member 167, the two latter members having relative axial movement. The clutch-controlling member 173 is provided with an arm 174 which is apertured and receives the upper end of a controlling link 176, the lower end of which extends through a swivel 177 pivoted to an arm 178 that is connected with the adjacent disk gang bail member 33. Preferably, the arm member 178 includes an arm section 179, a collar section 181 and a pin 182 or the like which connects the collar section 181 to the forwardly directed end of the associated bail. The link 176 carries a pair of collars 180, and a spring 185 is disposed between the swivel 177 and the upper collar 180. Rocking movement of the bail member 33, incident to raising and lowering of the disk gangs, acts through the arm 178 and the link 176 to rock the member 174. The latter has an angled face cooperating with an angled face on a stationary member 183 which is anchored to the frame as explained below. By virtue of the angled faces on the rocking member 174 and the stationary member 183, the rocking movement of the member 174 acts to engage and disengage the clutch 164. The present invention is not especially concerned with the particular details per se of the clutch unit 164.

Figure 7:
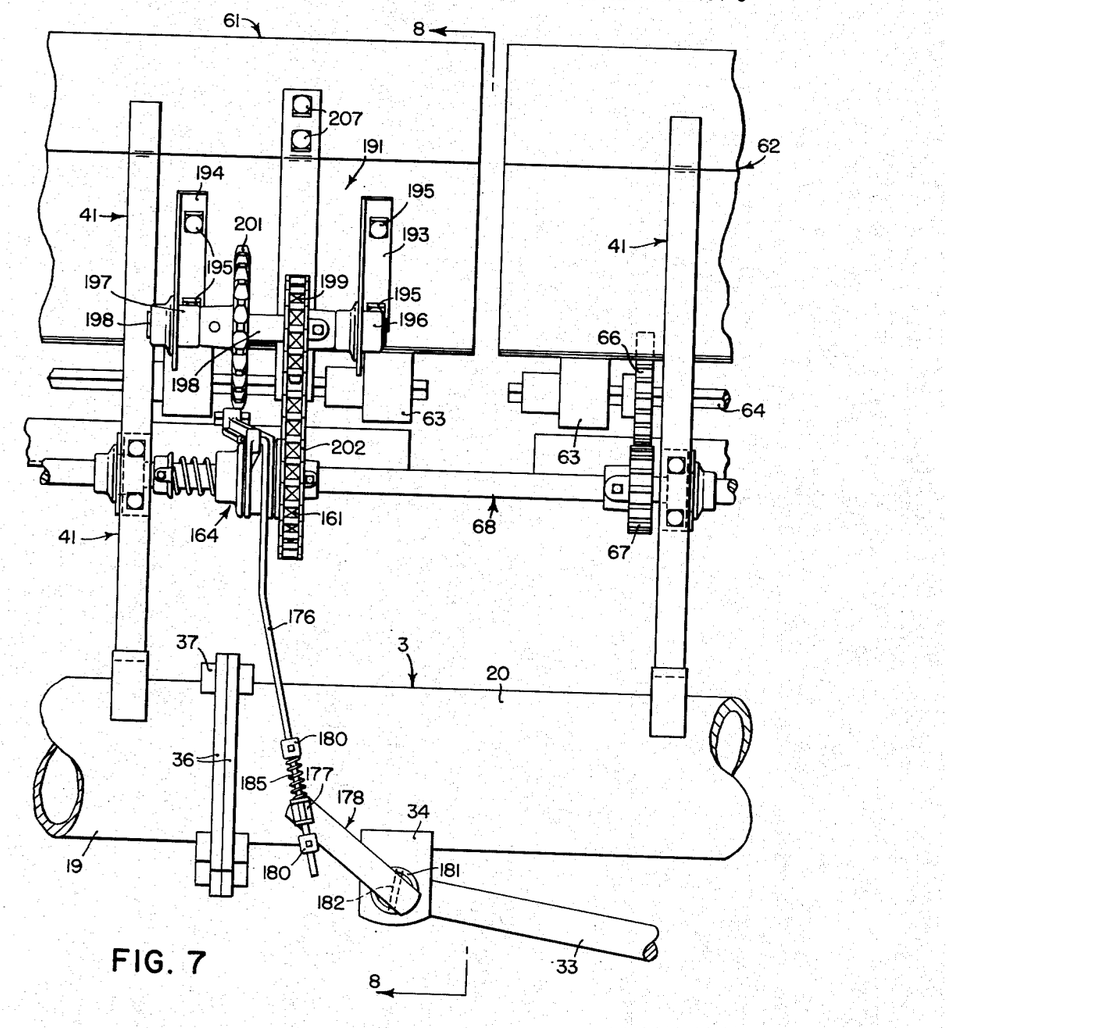
Figure 7 is a fragmentary front elevational view showing the speed-reducing jackshaft unit adapted to be used when it is desired to reduce the quantity of seed sown per acre.
Figure 8:
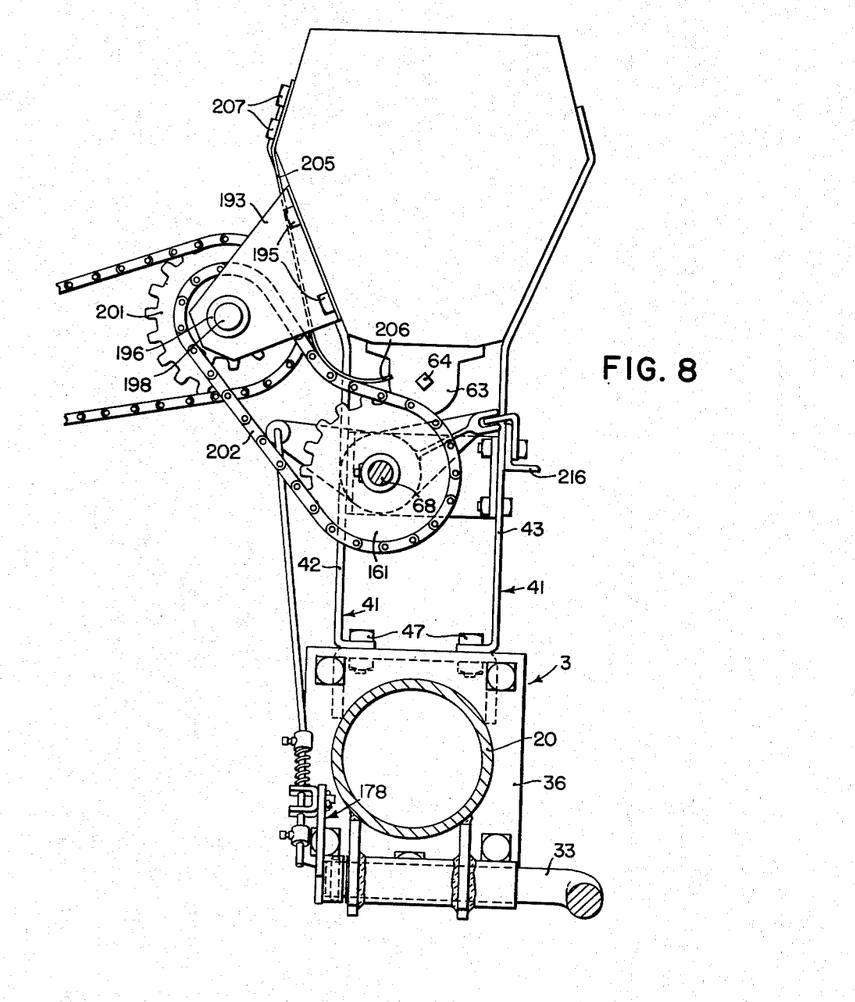
Figure 8 is an end view of the mechanism shown in Figure 7, corresponding generally to a section taken along the line 8—8 of Figure 7.
Figure 9:
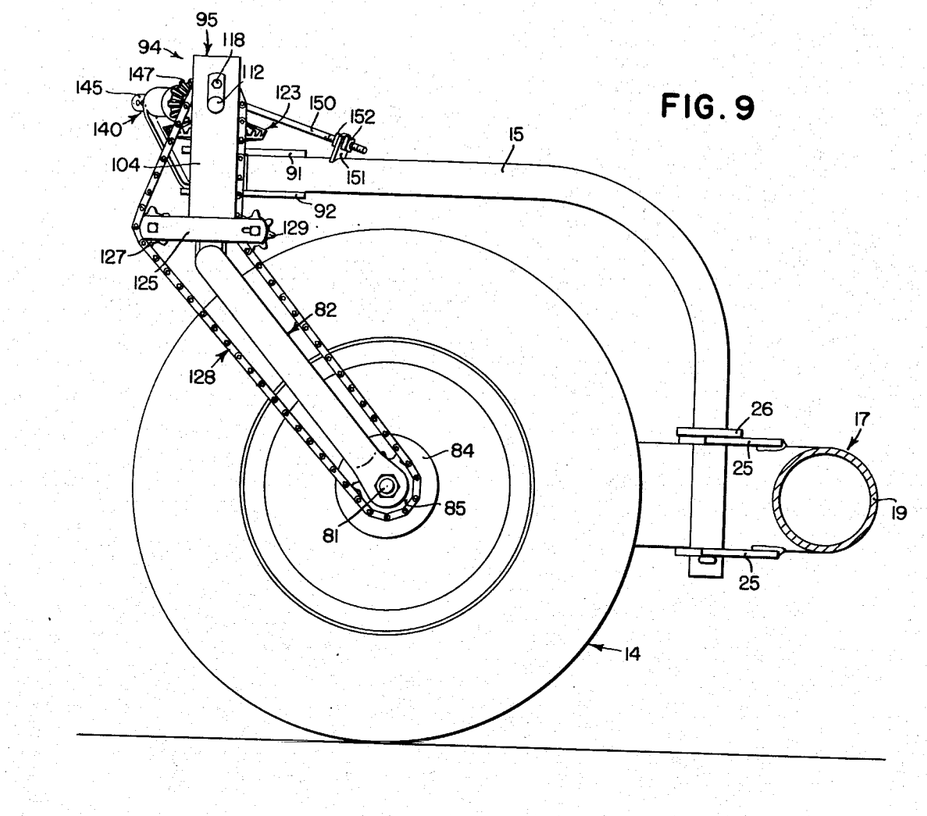
Figure 9 is a side view of the rear land wheel, its supporting bracket and associated drive parts.
Figure 10:
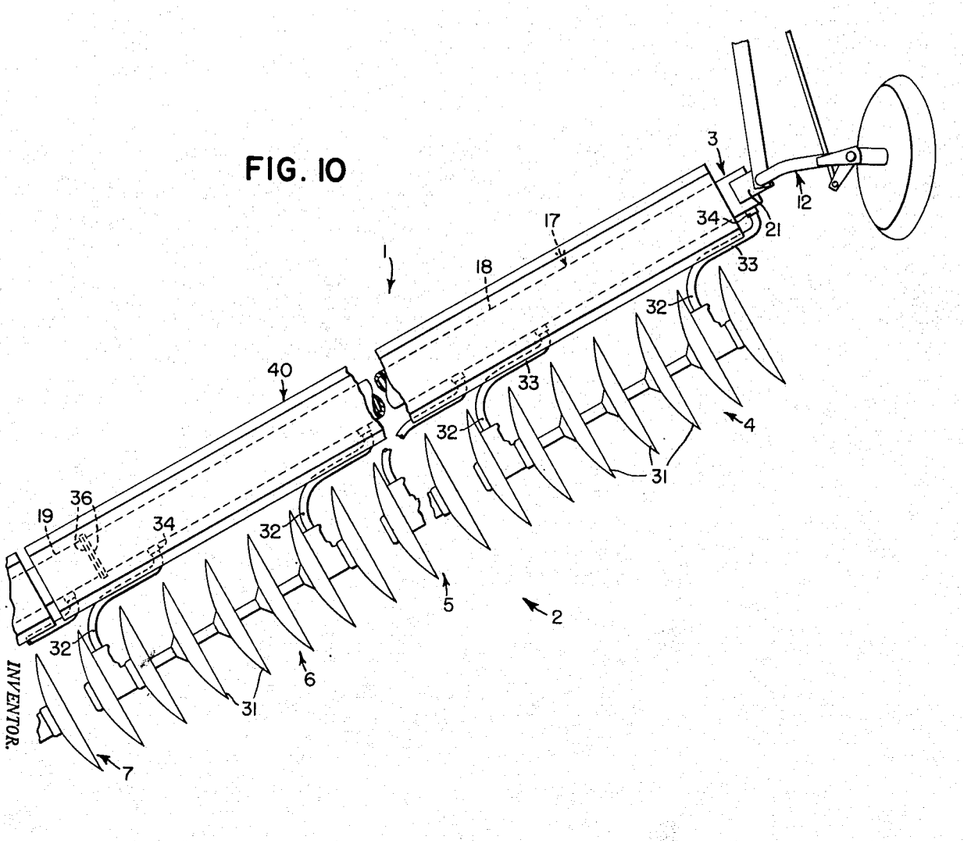
Figure 10 is a plan view of the front portion of the assembled disk tiller and seeding attachment, certain parts being omitted for purposes of clarity.
Figure 11:
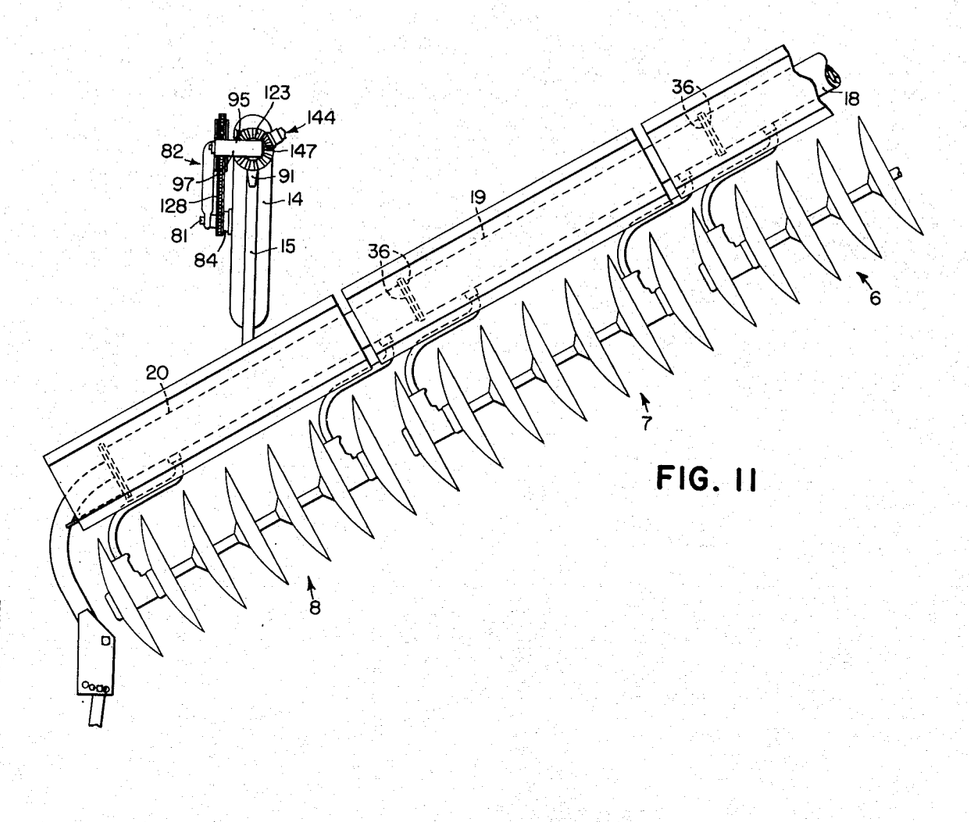
Figure 11 is a plan view of the rear portion of the assembled tiller and seeding attachment, certain parts being omitted for purposes of clarity, Figure 11 overlapping Figure 10.

Under some conditions, as when operating in arid sections where relatively small quantities of grain are thrown, it may be desirable to reduce the rate of rotation of the seeding mechanisms below that normally required. To this end, I provide knock-out sections 190 to provide openings in the walls of the main seed box 40, as well as in the auxiliary seed boxes 61, 62, etc., to receive attaching bolts so that, when desired, a speed-reducing unit 191 may be mounted on any seed box, for example, on the front wall of the seed box 61. Referring now to Figure 7, the speed-reducing unit 191 comprises a pair of supports 193 and 194 mounted by bolts 195 or the like attached to the front wall of the seed box 61 when the knock-out sections 190 are removed. The lower portions of the brackets 193 and 194 carry bearing means 196 and 197 in which a countershaft 198 is rotatably mounted. Fixed to the shaft 198 is a small gear sprocket 199 and a larger sprocket 201, both fixed to the shaft 198. The speed-reducing unit 191 is arranged so that the smaller sprocket 199 lies in the plane of the sprocket 161, being connected therewith by a drive chain 202. The larger sprocket 201 of the speed-reducing unit 191 receives a drive chain that extends from the caster wheel sprocket member 154, preferably the chain 162. However, in order to drive the sprocket 201 from the shaft 154, it is necessary to reverse the sprocket 154 (Figure 4) so as to bring the plane of the same laterally outwardly so as to lie coincidental with the plane of the sprocket 201. With the parts arranged in this manner, the rate of actuation of the seeding mechanism is reduced as compared with the rate which obtains when the sprocket 154 on the shaft 145 drives the seeding sprocket 161 directly. It will be understood, of course, that if it should be desired for the reason to increase the rate of seeding, the sprockets 199 and 201 may be interchanged. A chain tightener 205 for the chain 202 may be provided if desired. Preferably, the chain tightener 205 is in the form of a flat spring having a rounded end 206 adapted to ride on top of the chain 202 and secured at its upper end, as at 207, to the seed box 40. It will be understood, of course, that in the event one or more auxiliary seed units are provided, the speed-changing unit 191 may be mounted on one of the auxiliary seed boxes 60 at the location indicated by the knock-out sections 190, Figures 1b and 1c.

Each seeding mechanism 51 is provided with a seed tube 210, and in order to prevent interference between the seed tubes and the operating connections for the bail members 33, which are on the rear side of the frame pipe members, I provide a number of seed tube supports 212 which serve to support the grain tubes, particularly when the disk gangs are raised. The lower end of each of the seed tubes 210 is supported by a rod 213 that is fixed, as by a pair of lock nuts 214, to an angle 216 which extends along the brackets 41 and is fixed to the associated supporting strap members 43. The angle 216 also carries an anchoring lug 221 which cooperates with the stationary clutch control member 183, as best shown in Figure 6.

From the above description it will be seen that I have provided a seeding attachment particularly adapted for disk tillers and the like, especially those of the type in which the disk gangs are raised and lowered relative to the main frame on which the seeding attachment is mounted. Furthermore, the seeding attachment I have provided may readily have auxiliary seeding units added thereto or removed therefrom in order to accommodate any corresponding change in the number of auxiliary disk tiller units added to or taken away from the ground-working implement. The drive construction is such that the drive is taken from a caster ground wheel but the arrangement is such that the castering of the ground wheel does not interfere with the proper drive. Also, the drive mechanism is readily connected with any one of the jackshaft sections irrespective of whether one or more, or none, of the auxiliary seed boxes are incorporated in the machine. For example, when the implement is arranged with just the main frame section 18 and the main seed box 40, the clutch mechanism 164 is mounted on the main jackshaft section 55 (Figure 1a) with the attaching set screws 166 and 170 entering the hole or recess 55a and one of the holes or recesses 55b, and the land wheel bracket 15 and associated parts are connected with the sleeve member 24 on the main frame section 18 (Figure 1a).

Having described the preferred form of my invention, it is to be understood that my invention is not to be limited to the particular details shown and described above, but that, in fact, widely different means may be employed in the practice of the broader aspects of my invention.

What I claim, therefore, and desire to secure by Letters Patent is:

1. The combination with a disk tiller comprising a main frame section disposed diagonally to the line of operational travel and at least one auxiliary frame section attached to said main frame section in longitudinal alignment therewith and a ground wheel mounted on the diagonally rearmost of said frame sections and rotated by virtue of contact with the ground during the forward travel of the tiller, each frame section having mounted thereon a plurality of soil working tools for raising and lowering movement relative to the frame section and movable means for raising and lowering the tools, of a seeding attachment comprising a main seeding section and at least one auxiliary seeding section, a jackshaft comprised of a plurality of jackshaft sections, one jackshaft section on each seeding section and extending generally longitudinally thereof, means attaching said seeding sections to the respective frame sections with the jackshaft sections in longitudinal alignment, disconnectible means connecting the adjacent ends of said jackshaft sections, means for driving said jackshaft from said ground wheel including a disconnect clutch unit connected with one of said jackshaft sections, means for actuating said clutch unit to establish or interrupt the driving of said jackshaft, and means connecting said clutch unit actuating means to the movable means on one of said frame sections for interrupting driving of the jackshaft with raising of the tools.

2. The combination with a disk tiller comprising a main frame section disposed diagonally to the line of operational travel and at least one auxiliary frame section attached to said main frame section in longitudinal alignment therewith and a ground wheel mounted on the diagonally rearmost of said frame sections and partially supporting the disk tiller, each frame section having mounted thereon a plurality of soil working tools for raising and lowering movement relative to the frame section and movable means for raising and lowering the tools, of a seeding attachment comprising a main seeding section and at least one auxiliary seeding section, generally vertical supporting brackets secured to each of said seeding sections, each bracket having front and rear portions, mounting each of said seeding sections on the associated frame section, a bearing support carried by said front and rear portions, a jackshaft comprised of a plurality of jackshaft sections, one jackshaft section for each seeding section, means journalling each jackshaft section on the bearing supports of the associated brackets so as to extend generally longitudinally of the associated seeding section with the jackshaft sections in longitudinal alignment, disconnectible means connecting the adjacent ends of said jackshaft sections, means for driving said jackshaft from said ground wheel including a disconnect clutch unit mounted on one of said jackshaft sections, means for actuating said clutch unit to establish or interrupt the driving of said jackshaft, and means connecting said clutch unit actuating means to the movable means on one of said frame sections for interrupting driving of the jackshaft with raising of the tools.

References Cited in the file of this patent

UNITED STATES PATENTS

| Number | Name | Date |
|---|---|---|
| 650,922 | Wilbur | June 5, 1900 |
| 694,598 | Armitage | Mar. 4, 1902 |
| 701,642 | Stephenson | June 3, 1902 |
| 710,883 | Palmer | Oct. 7, 1902 |
| 760,442 | Fry | May 24, 1904 |
| 822,488 | Steinmann et al. | June 5, 1906 |
| 1,052,459 | Carr | Feb. 11, 1913 |
| 1,821,009 | Draper | Sept. 1, 1931 |
| 1,846,652 | Paul | Feb. 23, 1932 |
| 1,861,667 | Seaholm | June 7, 1932 |
| 1,865,376 | Kohler | June 28, 1932 |
| 2,378,635 | Hyland | June 19, 1945 |

FOREIGN PATENTS

| Number | Country | Date |
|---|---|---|
| 589,751 | Great Britain | June 30, 1947 |